Nov. 16, 1926.

A. O. HATLELI 1,607,197

ELECTRIC HANDSAW

Filed June 1, 1925

WITNESSES
Guy M. Spring

Inventor
ANDREW O. HATLELI.

By Richard B. Owen
Attorney

Nov. 16, 1926.
A. O. HATLELI
ELECTRIC HANDSAW
Filed June 1, 1925   4 Sheets-Sheet 2
1,607,197
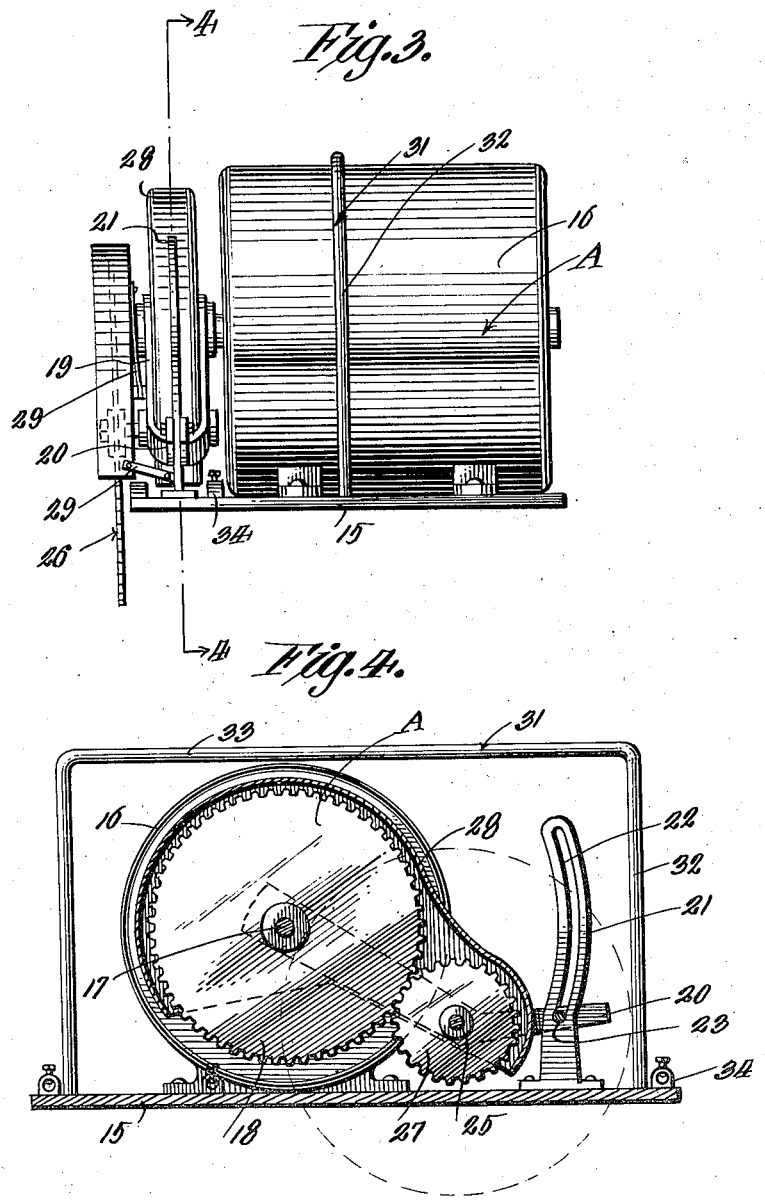
WITNESSES
Inventor
ANDREW O. HATLELI.
By Richard B. Owen
Attorney

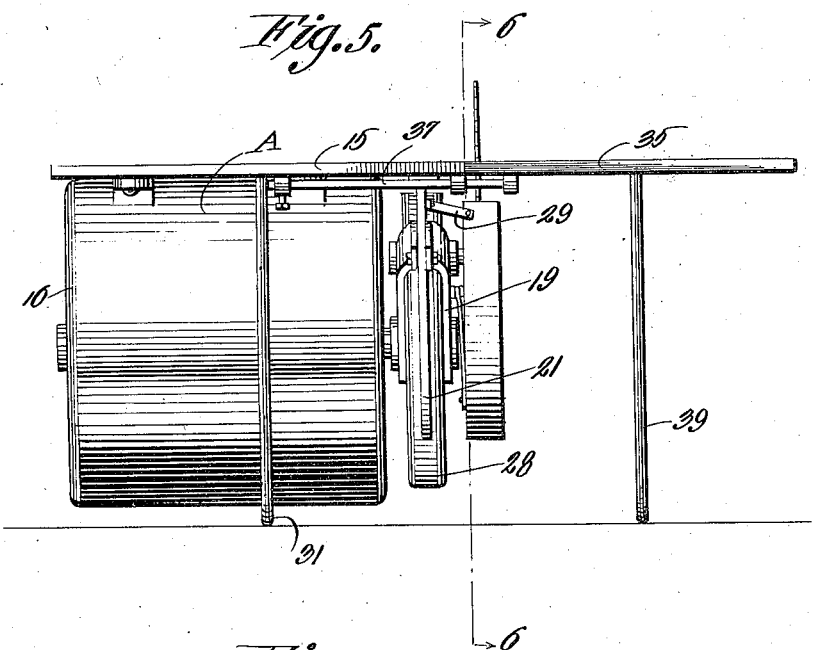
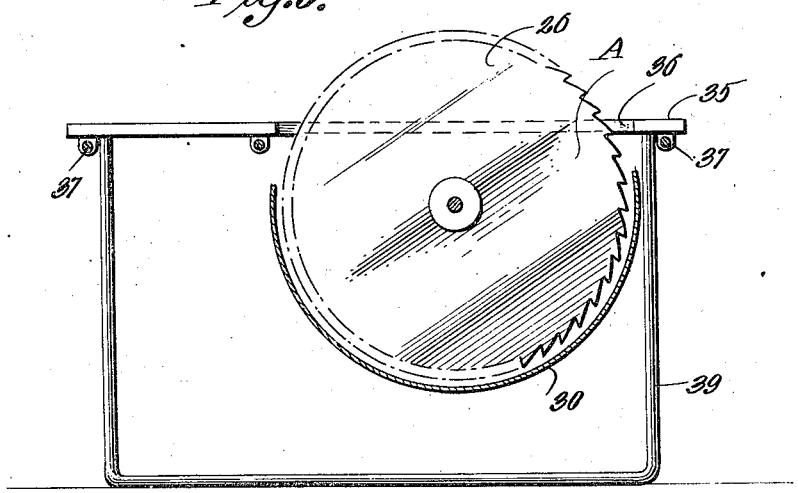

Nov. 16, 1926.

A. O. HATLELI 1,607,197

ELECTRIC HANDSAW

Filed June 1, 1925     4 Sheets-Sheet 4

WITNESSES

Inventor
ANDREW O. HATLELI.

By
Attorney

Patented Nov. 16, 1926.

1,607,197

UNITED STATES PATENT OFFICE.

ANDREW O. HATLELI, OF CROOKSTON, MINNESOTA.

ELECTRIC HANDSAW.

Application filed June 1, 1925. Serial No. 34,192.

This invention appertains to wood working tools and the primary object of the invention is to provide an electric driven hand saw of a light character, which can be readily carried from place to place to permit the same to be used by carpenters in lieu of the ordinary hand saws.

Another object of the invention is to provide a power operated hand saw which can be used for all kinds of work by using different types of saws on the drive shaft or mandrel.

Another object of the invention is to provide a portable power driven saw, which can be either used as a hand saw or a bench saw, novel means being provided for holding the table of the saw uppermost when the same is being used as a bench saw, said means forming the manipulating handle for the device when the same is being used as a hand saw.

A further object of the invention is the provision of novel arrangement of parts on the table to facilitate the use of the saw under various conditions and to render the device of a compact and durable nature.

Another object of the invention is the provision of means for permitting the detachable connection of an auxiliary table with the main table of the device when the same is being used as a bench saw.

A further object of the invention is the provision of novel means for supporting the saw mandrel, so as to permit the saw mandrel to be readily raised or lowered to the desired position, means being also provided for holding the mandrel against movement, when the same is in the desired adjusted position.

A still further object of the invention is to provide a power driven saw of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 3 is a front elevation of the saw,

Figure 1:
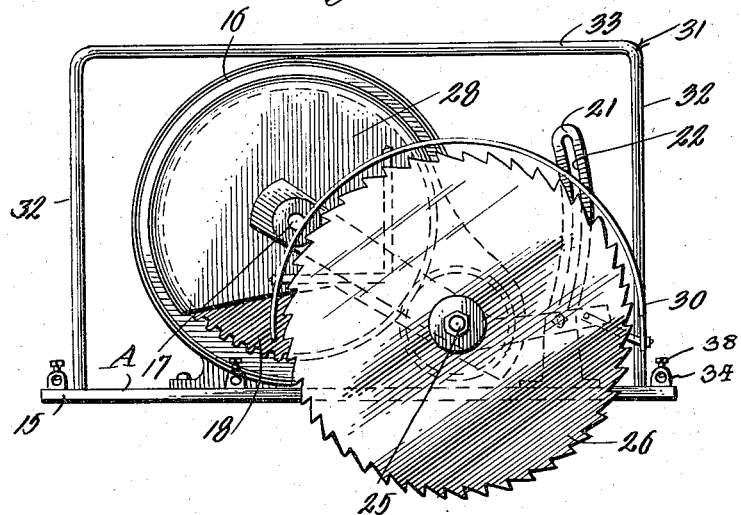
Figure 1 is a side elevation of the improved hand saw.
Figure 2:
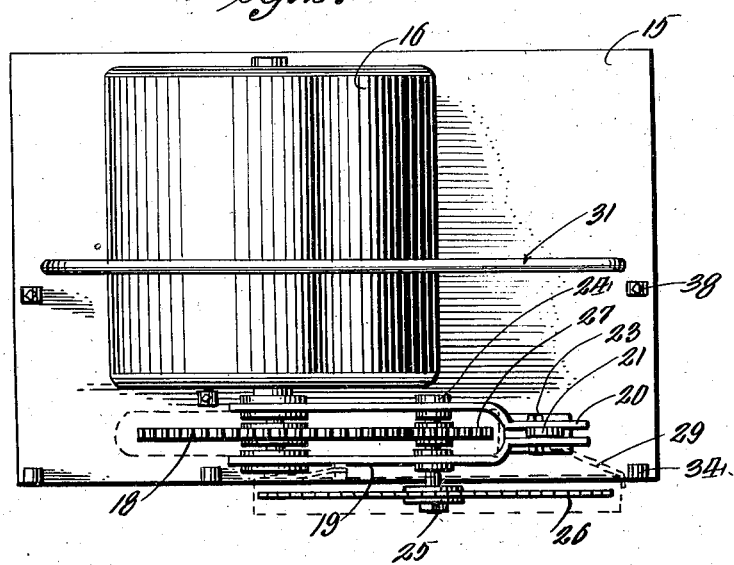
Figure 2 is a top plan view of the same.
Figure 7:
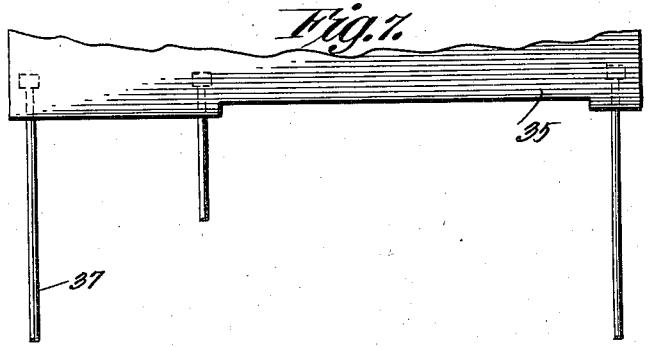
Figure 8:
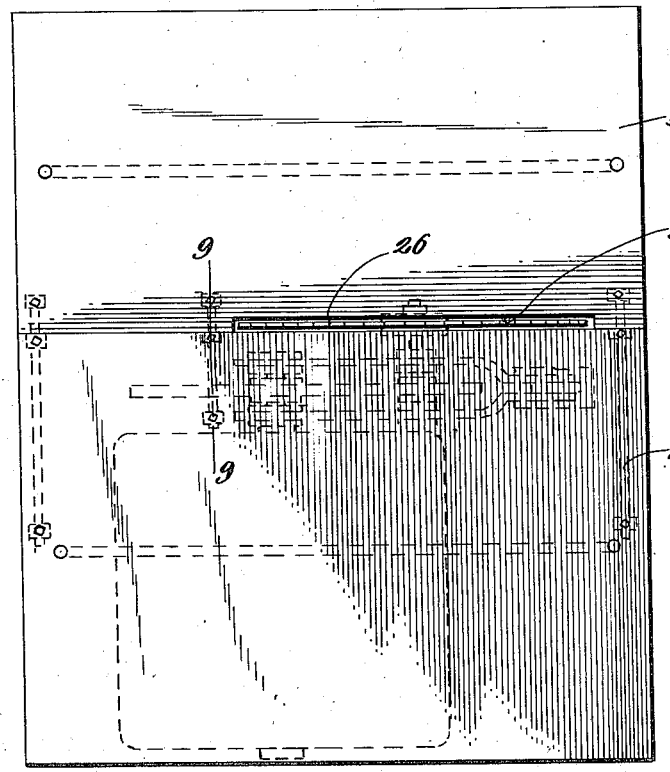
Figure 9:
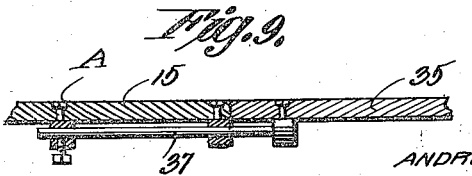

Figure 4 is a longitudinal section through the same taken on the line 4—4 of Figure 3 looking in the direction of the arrows, Figure 5 is a front elevation of the device when the same is being used as a bench saw with the auxiliary table connected thereto, Figure 6 is a section taken on the line 6—6 of Figure 5 looking in the direction of the arrows, showing the formation of the auxiliary table and the means of supporting the same, Figure 7 is a fragmentary plan view of the auxiliary table showing the connecting rod carried thereby, Figure 8 is a top plan view of the complete device when the same is being used as a bench saw, Figure 9 is a detail transverse section taken on the line 9—9 of Figure 8 illustrating the means of connecting the auxiliary table with the main table.

Referring to the drawings in detail, wherein similar reference characters designate corresponding parts throughout the several views, the letter A generally indicates the improved portable hand saw, which comprises a flat table 15 preferably formed of metal having smooth opposite faces for facilitating the sliding of the saw over the work, or the work over the table, according to whether the device is being used as a hand saw or a bench saw. Mounted directly upon one face of the table 15 inward of one longitudinal edge thereof is an electric motor 16 of the desired horse power. For a saw of the type disclosed, it is preferred to use a motor of one-quarter horse power and the table 15 can be cast directly on the base of the motor, or the motor can be bolted to the table as preferred. The armature shaft 17 of the motor is extended toward the mentioned longitudinal edge of the table 15 and has keyed or otherwise secured thereto a relatively large drive spur gear 18.

In accordance with this invention, the extended portion of the armature shaft 17 can be provided with suitable bearings on which are rotatably mounted the forwardly extending spaced arms 19 which are disposed on opposite sides of the drive spur gear 18. The forward terminals of the arms are converged and provided with spaced parallel legs 20 which receive snugly between the same the upright post 21. This post 21 is provided with flat opposite faces and is curved arcuately so as to conform to the arc of travel of the arms 19 incident to the raising and lowering thereof, as will be hereinafter more fully described. The standard 21 is provided with an arcuate slot 22, through which extends the tightening bolt 23 carried by legs 20 and it is obvious that by tightening the bolt, the swinging arms 19 will be held in any preferred adjusted position. It is to be noted at this point that the forwardly extending arms 19 are of a substantially L-shape and are provided with bearings 24 at their angles for rotatably supporting the saw shaft or mandrel 25. The saw shaft or mandrel 25 projects beyond one longitudinal edge of the table 15 and has detachably secured thereto in any conventional manner the circular saw 26. Keyed or otherwise secured to the saw shaft or mandrel 25 intermediate the arms 19 is a relatively small spur gear 27 which meshes with the drive spur gear 18. Any desired ratio gears 18 and 27 can be used, but it is desired to have the gear 27 of a smaller size than the gear 18 so as to drive the mandrel 25 at a relatively high rate of speed.

A suitable guard 28 is provided for the gears 18 and 27 and this guard is preferably secured to the arms 19 so that the guard will be movable with said arms incident to the adjusting of the saw. The arms 19 also support laterally extending brackets 29 to which is bolted a guard 30 for the circular saw 26.

In order to facilitate the use of the saw, an inverted U-shaped handle 31 is provided. As shown the handle 31 includes the spaced parallel legs 32 and a connecting bight portion 33 which extends over the motor 16. The legs 32 can be secured to the saw table 15 in any desired way. The handle 31 also forms means for supporting the saw in an inverted position when the same is used as a bench saw, as will be hereinafter more fully described.

It is to be readily understood that different types of saws are to be connected with the mandrel, so that the saw can be used on different kinds of work, and by attaching different tools to the mandrel, molding and the like can be readily made. Also grinding wheels can be secured to the mandrel to permit the ready sharpening of a carpenter's tool, while the carpenter is on the job. The base of the table 15 which carries the motor 16 is provided with spaced apertured lugs 34 for facilitating the connection of an auxiliary table 35 with the main table 15 when the device is used as a bench saw. The auxiliary table 35 is also provided with plain opposite faces and the inner longitudinal edge thereof is notched as at 36 so as to receive the saw 26. The mentioned longitudinal edge of the auxiliary table 35 has projecting laterally of the same connecting rods 37 which are secured to one face of the auxiliary table in any preferred way. These attaching rods 37 are adapted to be inserted through the apertured lugs 34 certain of which are provided with set screws 38 for impinging against the rods to firmly hold the auxiliary table in position. The auxiliary table is provided with a U-shaped support 39, which is of the same size as the U-shaped handles 31 and of the same configuration thereof and is adapted to cooperate with the handle 31 for forming a support for the device when the same is in its inverted position as shown in Figures 5 and 6 for use as a bench saw.

In operation of the saw, when the same is being used as a hand saw, the auxiliary table 35 is removed, and the table 15 is laid on the work and the saw is forced against the same by the use of a handle 31.

It is preferred to connect the motor 15 with ordinary house current, but it is to be understood that electric energy can be derived from any source, such as a storage battery or the like.

Changes in details may be made without departing from the spirit or scope of this invention, but:

What I claim as new is:

1. A portable power driven device for use as a hand and bench saw comprising a table, an electric motor carried by one face of the table including an armature shaft projecting toward one edge of the table, a swinging frame rotatably mounted upon the armature shaft, a mandrel rotatably supported by the frame, a tool mounted upon the mandrel, means for operating the mandrel from the armature shaft, and means carried by the table for permitting the face of the table opposite from the face carrying the motor to be supported in an upright position whereby the device can be used as a bench tool.

2. In a power driven portable device, a plain flat table, an electric motor carried by one face of the table having the armature shaft thereof projecting toward one longitudinal edge thereof, a handle extending over the motor for manipulating the device, a swinging frame carried by the armature shaft a mandrel carried by the swinging frame, means operatively connecting the mandrel with the armature shaft, the handle forming a support for the device when the same is in an inverted position and used as a bench tool.

3. A power driven portable tool comprising a base plate, a motor carried by one face of the base plate, having a drive shaft, a mandrel, means for rotating the mandrel from the drive shaft, a tool mounted upon the mandrel, spaced apertured lugs carried by the mentioned face of the base plate, an auxiliary base plate, spaced rods carried by the auxiliary base plate for fitting in said apertured lugs, the inner end of the auxiliary base plate being notched to receive the tool, and means carried by the auxiliary base plate and the main base plate for permitting the tool to be placed upon a support.

4. A power driven portable tool comprising a base plate, a motor carried by one face of the base plate having an armature shaft projecting toward one longitudinal edge thereof, a spur gear carried by the armature shaft, a post secured to the mentioned face of the base plate, a frame mounted upon the armature shaft and comprising a pair of spaced parallel arms disposed at opposite sides of the gear, said arms being provided with parallel terminal legs snugly engaging the opposite sides of the post, a mandred carried by the arms and projecting beyond the mentioned longitudinal edge of the base plate, a tool carried by the mandrel outwardly of the said base plate, a gear carried by the mandrel between the said arms and meshing with the said spur gear, and a handle carried by the base plate and extending over the motor for manipulating the device, said handle forming a support for the device when the same is in an inverted position and used as a bench tool.

In testimony whereof I affix my signature.

ANDREW O. HATLELI.